United States Patent
Hafez

(10) Patent No.: US 11,582,186 B2
(45) Date of Patent: Feb. 14, 2023

(54) ENHANCED AND/OR MORE EFFICIENT FIXED-MOBILE CONVERGENCE CAPABILITIES AND/OR DEVICE DISCOVERY CAPABILITIES WITHIN A TELECOMMUNICATIONS NETWORK

(71) Applicant: Deutsche Telekom AG, Bonn (DE)

(72) Inventor: Ahmed Hafez, Duesseldorf (DE)

(73) Assignee: DEUTSCHE TELEKOM AG, Bonn (DE)

( * ) Notice: Subject to any disclaimer, the term of this patent is extended or adjusted under 35 U.S.C. 154(b) by 122 days.

(21) Appl. No.: 17/330,431

(22) Filed: May 26, 2021

(65) Prior Publication Data

US 2021/0377213 A1   Dec. 2, 2021

(30) Foreign Application Priority Data

May 28, 2020   (EP) .................................... 20177071

(51) Int. Cl.
*H04L 9/40*       (2022.01)
*H04W 12/0471*  (2021.01)
*H04W 12/06*    (2021.01)

(52) U.S. Cl.
CPC .......... *H04L 63/0209* (2013.01); *H04L 63/08* (2013.01); *H04W 12/0471* (2021.01); *H04W 12/06* (2013.01)

(58) Field of Classification Search
CPC ............... H04L 63/0209; H04L 63/08; H04W 12/0471; H04W 12/06
See application file for complete search history.

(56) References Cited

U.S. PATENT DOCUMENTS

| | | | |
|---|---|---|---|
| 2015/0111534 A1* | 4/2015 | Grayson | H04W 12/06 455/414.3 |
| 2020/0145294 A1* | 5/2020 | Saghir | H04W 12/08 |

(Continued)

FOREIGN PATENT DOCUMENTS

| | | |
|---|---|---|
| EP | 2750426 A1 | 7/2014 |
| EP | 2854448 A1 | 4/2015 |

OTHER PUBLICATIONS

Ruckus White Paper, "Integrating Wi-Fi RANs into the Mobile Packet Core", Retrieved From https://www.commscope.com/globalassets/digizuite/1535-1365-wp-integrating-wifi-rans-into-the-mobile-packet-core.pdf, Published 2014. (Year: 2014).*

(Continued)

*Primary Examiner* — Chau Le
(74) *Attorney, Agent, or Firm* — Leydig, Voit & Mayer, Ltd.

(57) ABSTRACT

A method for providing fixed-mobile convergence capabilities and/or device discovery capabilities within a telecommunications network includes: a specific client device or user equipment is connected to or connects to the home gateway device in order to connect to the telecommunications network; the home gateway device uses the connection to the specific client device or user equipment to initiate an exchange of messages according to an authentication or key exchange protocol, wherein the authentication or key exchange protocol is an extensible authentication protocol (EAP) or an enhanced authentication and key agreement (AKA), wherein identity information of the specific client device or user equipment is transmitted to the home gateway device as part of at least one message of the authentication or key exchange protocol; and the authentication or key exchange protocol is prematurely terminated.

12 Claims, 1 Drawing Sheet

(56) References Cited

U.S. PATENT DOCUMENTS

| | | | | |
|---|---|---|---|---|
| 2021/0036988 | A1* | 2/2021 | McKibben | H04W 12/122 |
| 2022/0060893 | A1* | 2/2022 | Gundavelli | H04W 12/069 |
| 2022/0141665 | A1* | 5/2022 | Henry | H04W 12/086 |
| | | | | 726/4 |
| 2022/0159460 | A1* | 5/2022 | Ben Henda | H04W 12/041 |
| 2022/0369357 | A1* | 11/2022 | Luo | H04W 72/14 |

OTHER PUBLICATIONS

3GPP, "3$^{rd}$ Generation Partnership Project; Technical Specification Group Service and System Aspects; 3G Security; Wireless Local Area Network (WLAN) Interworking Security; (Release 6)", 3GPP TS 33.234, Nov. 18-21, 2003, version 0.7.0, pp. 1-50, 3$^{rd}$ Generation Partnership Project, Munich, Germany, XP050380635.

* cited by examiner

US 11,582,186 B2

ENHANCED AND/OR MORE EFFICIENT FIXED-MOBILE CONVERGENCE CAPABILITIES AND/OR DEVICE DISCOVERY CAPABILITIES WITHIN A TELECOMMUNICATIONS NETWORK

CROSS-REFERENCE TO PRIOR APPLICATIONS

Priority is claimed to European Patent Application No. EP 20 177 071.6, filed on May 28, 2020, the entire disclosure of which is hereby incorporated by reference herein.

FIELD

The present invention relates a method for providing enhanced and/or more efficient fixed-mobile convergence capabilities and/or device discovery capabilities within a telecommunications network, wherein a home gateway device, being connected to the telecommunications network, provides connectivity or the possibility to connect, to the telecommunications network, to one or a plurality of client devices or user equipments connected to the home gateway device.

Additionally, the present invention relates to a telecommunications network for providing enhanced and/or more efficient fixed-mobile convergence capabilities and/or device discovery capabilities within a telecommunications network, wherein a home gateway device, being connected to the telecommunications network, provides connectivity or the possibility to connect, to the telecommunications network, to one or a plurality of client devices or user equipments connected to the home gateway device.

Still additionally, the present invention relates to a home gateway device as part of or connected to a telecommunications network for providing enhanced and/or more efficient fixed-mobile convergence capabilities and/or device discovery capabilities within the telecommunications network, wherein the home gateway device provides connectivity or the possibility to connect, to the telecommunications network, to one or a plurality of client devices or user equipments connected to the home gateway device.

Furthermore, the present invention relates to a program and to a computer-readable medium for providing enhanced and/or more efficient fixed-mobile convergence capabilities and/or device discovery capabilities within a telecommunications network.

BACKGROUND

The present application generally relates to the area of providing or realizing an ever better or more efficient fixed-mobile convergence or -mobile convergence capabilities. One aspect thereof is related to the fact that, typically and conventionally, different identifiers, i.e. different kinds of identifiers, are used to identify subscribers within a fixed-line telecommunications network on the one hand, and within a mobile telecommunications network (or mobile communication network) on the other hand. In case one and the same operator operates both a fixed-line telecommunications network and a mobile telecommunications network (within the same geographical area), due to such different identities being typically used for subscribers in the fixed-line part and in the mobile part, it might be difficult or even impossible for the network operator to associate who of the mobile customers are also having fixed network contracts or belonging, e.g., to the same family or household, except, perhaps, the owners of the respective contract themselves. Hence, due to this situation, there might be barriers to provide converged products (i.e. fixed-mobile convergence products) to subscribers or customers.

SUMMARY

In an exemplary embodiment, the present invention provides a method for providing fixed-mobile convergence capabilities and/or device discovery capabilities within a telecommunications network. A home gateway device connected to the telecommunications network provides connectivity or the possibility to connect to the telecommunications network for one or more client devices or user equipments connected to the home gateway device. A specific client device or user equipment is configured to connect to the home gateway device and to the telecommunications network or another telecommunications network using a subscriber identity module integrated with the specific client device or user equipment. The method comprises: in a first step, the specific client device or user equipment is connected to or connects to the home gateway device in order to connect to the telecommunications network; in a second step, subsequent to the first step, the home gateway device uses the connection to the specific client device or user equipment to initiate an exchange of messages according to an authentication or key exchange protocol, wherein the authentication or key exchange protocol is an extensible authentication protocol (EAP) or an enhanced authentication and key agreement (AKA), wherein identity information of the specific client device or user equipment is transmitted to the home gateway device as part of at least one message of the authentication or key exchange protocol; and in a third step, subsequent to the second step, the authentication or key exchange protocol is prematurely terminated.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
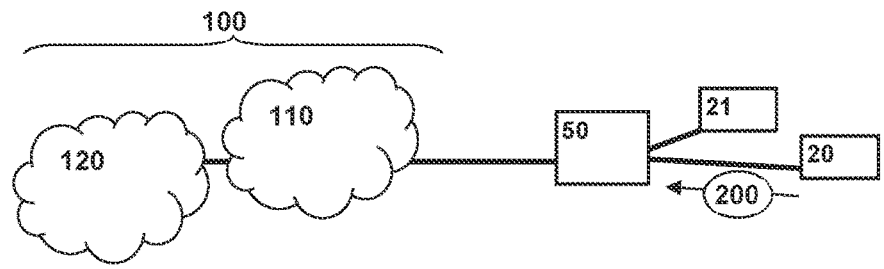
FIG. 1 schematically illustrates a telecommunications network or a system according to the present invention, comprising an access network and a home gateway device, the home gateway device providing connectivity (or the possibility to connect to the telecommunications network) to one or a plurality of client devices or user equipments connected to the home gateway device.

Exemplary embodiments of the present invention provide an effective and comparatively simple solution such that enhanced and/or more efficient fixed-mobile convergence capabilities and/or device discovery capabilities are possible to be realized within a telecommunications network.

In an exemplary embodiment, the present invention provides a method for providing enhanced and/or more efficient fixed-mobile convergence capabilities and/or device discovery capabilities within a telecommunications network, wherein a home gateway device, being connected to the telecommunications network, provides connectivity or the possibility to connect, to the telecommunications network, to one or a plurality of client devices or user equipments connected to the home gateway device, wherein a specific client device or user equipment—besides being able to connect to the home gateway device—is capable to connect to the telecommunications network, or to another telecommunications network, using a subscriber identity module integrated with the specific client device or user equipment, wherein the method comprises the following steps:

in a first step, the specific client device or user equipment is connected to or connects to the home gateway device in order to connect to the telecommunications network, in a second step, subsequent to the first step, the home gateway device uses the connection to the specific client device or user equipment to initiate an exchange of messages according to an authentication or key exchange protocol, the authentication or key exchange protocol being a protocol out of an extensible authentication protocol (EAP) and an enhanced authentication and key agreement (AKA), wherein identity information of the specific client device or user equipment is transmitted to the home gateway device as part of at least one message of the authentication or key exchange protocol used, in a third step, subsequent to the second step, the authentication or key exchange protocol is prematurely terminated.

It is thereby advantageously possible, according to the present invention, to discover user equipments or mobile devices that might—typically when located at another location—be connected to the telecommunications network (i.e. its mobile part) or to another telecommunications network or another mobile communication network using a radio access network access but that are (presently) connected to the (fixed-line part of the) telecommunications network via the home gateway device. Hence, also such user equipment or client devices are possible to be discovered that belong to or are used by, e.g., family members or staff (of the household or office, typically, of the home gateway device or where it is located); thereby, it is advantageously possible to strengthen the fixed/mobile proposition and extend it to, e.g., the whole family by creating the corresponding associations automatically. According to conventional processes, the family of the fixed line owner and all the subscriber identity module (SIM) based contracts at home can only be identified by manual intervention and an extra request to the contract owner.

According to the present invention, it is advantageously possible to provide for automatic provisioning of customers, e.g., for public and community Wi-Fi if they only connect (with their mobile device, i.e. their user equipment) to their fixed network at home (i.e. to their or to the associated home gateway device). Such automatic provisioning typically requires new procedures in the authentication, additional data collection and extension of existing functions and/or databases. According to the present invention, especially an already existing authentication or key exchange protocol is used for the purpose to discover—via the transmission of identity information of the client device or user equipment and using a home gateway device—such mobile devices or user equipment connected to the home gateway device. The authentication or key exchange protocol used is typically an extensible authentication protocol (EAP) and/or an enhanced authentication and key agreement (AKA). According to the present invention, some existing databases (e.g. within the home gateway device and/or the customer database) need to be extended or modified; furthermore, the access control server node or instance typically needs to be modified or extended.

Furthermore according to the present invention, it is advantageously possible to detect or determine whether a user equipment or client device connected to a home gateway device is actually SIM-based (i.e. has or comprises a subscriber identity module), hence, it is possible to determine how many devices connected to home gateway devices (i.e. at homes or at (small) offices) are actually SIM-based. It is furthermore possible to determine a correlation between a device identity at home (e.g. via the MAC-address) and the user identity in the mobile network using the SIM (i.e. typically the IMSI). Additionally, whether such mobile devices belong to (or are customers of) the telecommunications network (or its mobile part), or not, is likewise possible to be determined.

According to the present invention, it is advantageously possible to overcome difficulties in conventional telecommunications networks, resulting from different identities to identify, authenticate and authorize customers to use different services, especially in the mobile part of the telecommunications network and in the fixed-line part of the telecommunications network. Such different identities mask the user identity and is only identified in the corresponding part of the telecommunications network, i.e. in every (type of) access in isolation. By using manual processes (e.g. in the contract activation), it is at most only partially possible—in conventional telecommunications networks—to link mobile (i.e. the identities used in the mobile part of the telecommunications network, i.e. the corresponding mobile devices or user equipments and the corresponding customers or subscribers) and fixed (i.e. the identities used in the fixed-line part of the telecommunications network, i.e. the corresponding devices or user equipments also having access via a (fixed-line) home gateway device and the corresponding customers or subscribers) in the IT domain, typically leaving behind the rest of the family at home, and, additionally, the contract owner is not known to the network domain as a converged customer.

According to the present invention, customers or subscribers are advantageously automatically linked regarding their fixed-line and mobile identifiers; additionally, no separate applications—e.g. to be installed on mobile devices or the like—are necessary or needed, only the SIM-based device (i.e. the user equipment) itself is required. For example, the contract of the fixed line might be on the parent's name, and the parent has a SIM card with the telecommunications network—hence, IT systems within the telecommunications network are aware of the correlation between the contract holder identity in fixed and mobile; the other members of the family will connect to the home gateway device using username/password (especially obtained by the most advanced and convenient techniques) as credentials (also with their mobile devices). Conventionally, regarding other devices at the home, it is unknown whether those are Wi-Fi-only or SIM-based. According to the present invention, this is different: The home gateway device initiates the authentication or key exchange protocol (e.g. the EAP-SIM procedure) over the master service set identifier (SSID) of the home gateway device in order to proceed with a discovery phase (i.e. the home gateway device triggering device discovery) for the mobile and fixed identity linkage: if the connected device responds with rejection of the request, this device is flagged as Wi-Fi-only device in the database of the home gateway device; otherwise if the connected device has a SIM and starts responding (to the authentication or key exchange protocol initiated by the home gateway device) with the international mobile subscriber identity (IMSI), the home gateway device aborts the procedure (prematurely) and reconnects the device based on username and password to the master SSID, and registers or stores its IMSI (i.e. the identity information) in the database of the home gateway device. Once the home gateway device has a table of all devices connected to it on the master SSID, it can classify them and correlate them with their known media access control address (MAC) addresses and any other 802.x standard information.

Regarding the time or time period the method or procedure according to the present invention is performed, it is preferred according to the present invention that the method is triggered or initiated during an idle time of the user equipment or mobile device. Thereby, it is advantageously possible that either no service disruption or service deterioration occurs or that such service disruption or service deterioration (due to performing an exemplary embodiment of the inventive method) is reduced as much as possible. Alternatively or cumulatively, the procedure according to the present invention or according to an exemplary embodiment of the inventive method can also be repeated every defined period to verify data consistence and capture changes.

According to a preferred embodiment of the present invention, during the first step, an authentication is performed and succeeds to authenticate the specific client device or user equipment to connect to the home gateway device and/or to the telecommunications network, wherein especially the connection between the specific client device or user equipment and the home gateway device is established using one or a plurality of credentials to gain access or to connect to the home gateway device, especially credentials to establish a Wi-Fi connection.

It is thereby advantageously possible to easily establish an authenticated communication link between the specific client device or specific user equipment towards the home gateway device, and, typically, also towards the telecommunications network, using typically the credentials used to establish the local communication, often using a Wi-Fi link. This means that, prior to the second step, i.e. prior to initiating the authentication or key exchange protocol to obtain the identity information of a SIM-based device, the client device or user equipment is already connected and authenticated to or towards the home gateway device.

According to a further preferred embodiment of the present invention, the authentication or key exchange protocol corresponds to one of the EAP-SIM and EAP-AKA protocols, wherein especially, during the third step, the authentication or key exchange protocol used is unfinished or incomplete upon its termination, wherein especially only EAP-Request/Identity messages and EAP-Response/Identity messages are exchanged between the home gateway device and the specific client device or user equipment, and/or wherein especially only EAP-Request/Identity messages, EAP-Response/Identity messages, EAP-Request/SIM/Start messages and EAP-Response/SIM/Start messages are exchanged between the home gateway device and the specific client device or user equipment.

Thereby, it is comparatively easily possible to effectively implement exemplary embodiments according to the present invention.

According to a further preferred embodiment of the present invention, the specific client device or user equipment comprises international mobile subscriber identity (IMSI) information or Mobile Customer identity information, wherein the identity information transmitted to the home gateway device as part of at least one message of the authentication or key exchange protocol used corresponds to the international mobile subscriber identity information or the Mobile Customer identity information of the specific client device or user equipment.

Thereby, it is advantageously possible to effectively implement exemplary embodiments according to the present invention.

According to a further preferred embodiment of the present invention, especially via the specific client device or user equipment being connected, especially repeatedly and/or regularly connected, to the home gateway device, the home gateway device and the specific client device or user equipment are related or associated to one another, wherein especially the home gateway device comprises an access point and a database, wherein the identity information of the specific client device or user equipment, transmitted to the home gateway device during the second step, is stored in the database of the home gateway device.

Via the home gateway device comprising a database for storing the identity information of the specific client device or user equipment, it is advantageously possible to efficiently discover and preliminarily store the identity information obtained from the specific client devices or user equipments connected to the home gateway device.

According to still a further embodiment of the present invention, the identity information of the specific client device or user equipment is transmitted to the telecommunications network, especially to an access control server node or instance of the telecommunications network as being related or associated to the home gateway device, wherein especially the identity information of the specific client device or user equipment is transmitted to a mobile number portability platform of the telecommunications network, especially in order to obtain information, from the mobile number portability platform, regarding whether the specific client device or user equipment is associated with the telecommunications network, or with another telecommunications network, and especially in case that the access control server node or instance did previously not have knowledge of the identity information of the specific client device or user equipment being related or associated to the home gateway device.

It is thereby comparatively easily possible to effectively implement exemplary embodiments according to the present invention.

According to still a further embodiment of the present invention, the information of the specific client device or user equipment being related or associated to the home gateway device, especially with the information obtained from the mobile number portability platform regarding the specific client device or user equipment, is transmitted to and stored at a customer database of the telecommunications network.

It is thereby comparatively easily possible to effectively implement exemplary embodiments according to the present invention.

According to a further preferred embodiment of the present invention, user or subscriber consent is obtained regarding the user or subscriber of the home gateway device and/or the user or subscriber of the specific client device or user equipment regarding, and especially prior to:

the identity information of the specific client device or user equipment being transmitted to the home gateway device as part of the authentication or key exchange protocol used, and/or the identity information of the specific client device or user equipment being stored in the database of the home gateway device, and/or the identity information of the specific client device or user equipment being transmitted to the telecommunications network.

It is thereby comparatively easily possible to effectively implement exemplary embodiments according to the present invention.

The present invention furthermore also relates to a telecommunications network for providing enhanced and/or more efficient fixed-mobile convergence capabilities and/or device discovery capabilities within a telecommunications network, wherein a home gateway device, being connected to the telecommunications network, provides connectivity or the possibility to connect, to the telecommunications network, to one or a plurality of client devices or user equipments connected to the home gateway device, wherein a specific client device or user equipment—besides being able to connect to the home gateway device—is capable to connect to the telecommunications network, or to another telecommunications network, using a subscriber identity module integrated with the specific client device or user equipment, wherein the telecommunications network is configured for performance of a method comprising the following steps:

in a first step, the specific client device or user equipment is connected to or connects to the home gateway device in order to connect to the telecommunications network, in a second step, subsequent to the first step, the home gateway device uses the connection to the specific client device or user equipment to initiate an exchange of messages according to an authentication or key exchange protocol, the authentication or key exchange protocol being a protocol out of an extensible authentication protocol (EAP) and an enhanced authentication and key agreement (AKA), wherein identity information of the specific client device or user equipment is transmitted to the home gateway device as part of at least one message of the authentication or key exchange protocol used, in a third step, subsequent to the second step, the authentication or key exchange protocol is prematurely terminated.

Furthermore, the present invention relates to a home gateway device as part of or connected to a telecommunications network for providing enhanced and/or more efficient fixed-mobile convergence capabilities and/or device discovery capabilities within the telecommunications network, wherein the home gateway device provides connectivity or the possibility to connect, to the telecommunications network, to one or a plurality of client devices or user equipments connected to the home gateway device, wherein a specific client device or user equipment—besides being able to connect to the home gateway device—is capable to connect to the telecommunications network, or to another telecommunications network, using a subscriber identity module integrated with the specific client device or user equipment, wherein the home gateway device is configured for performance of a method comprising the following steps:

in a first step, the specific client device or user equipment is connected to or connects to the home gateway device in order to connect to the telecommunications network, in a second step, subsequent to the first step, the home gateway device uses the connection to the specific client device or user equipment to initiate an exchange of messages according to an authentication or key exchange protocol, the authentication or key exchange protocol being a protocol out of an extensible authentication protocol (EAP) and an enhanced authentication and key agreement (AKA), wherein identity information of the specific client device or user equipment is transmitted to the home gateway device as part of at least one message of the authentication or key exchange protocol used, in a third step, subsequent to the second step, the authentication or key exchange protocol is prematurely terminated.

Especially regarding the home gateway device, it is preferred according to the present invention that the home gateway device comprises, besides an access point, a database, especially for storing identity information of different client devices or user equipments connected to and/or discovered by the home gateway device.

Additionally, the present invention relates to a program comprising a computer readable program code which, when executed on a computer and/or on a home gateway device and/or on a network node of a telecommunications network, especially an access control server node or instance, or in part on the home gateway device and/or in part on the network node of the telecommunications network, especially the access control server node or instance, causes the computer and/or the home gateway device and/or the network node of the telecommunications network to perform an exemplary embodiment of the inventive method.

Still additionally, the present invention relates to a computer-readable medium comprising instructions which when executed on a computer and/or on a home gateway device and/or on a network node of a telecommunications network, especially an access control server node or instance, or in part on the home gateway device and/or in part on the network node of the telecommunications network, especially the access control server node or instance, causes the computer and/or the home gateway device and/or the network node of the telecommunications network to perform an exemplary embodiment of the inventive method.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 or system according to the present invention is schematically shown, comprising an access network 110 and a core network 120, especially a 5G core network. The access network 110 of the telecommunications network 100 is especially a fixed-line access network, and a home gateway device 50 is connected to the telecommunications network 100 using the access network 110 in order to be provided with one or a plurality of communication services, typically for client devices 20, 21 (or user equipments) connected to the home gateway device 50. The client devices 20, 21 (or user equipments) are often connected wirelessly to the home gateway device 50 using a wireless connection, especially according to the (or a) Wi-Fi-standard, wireless local area network (WLAN)-standard, or Bluetooth-standard or another short-range wireless communication technology. However, the client devices or user equipments 20, 21 or a subset of the client devices or user equipments 20, 21 may also (alternatively or cumulatively) be connected to the home gateway device 50 using a wireline connection such as an Ethernet cable or LAN (local area network) cable connection.

Alternatively to one or a plurality of the client devices or user equipments 20, 21 being connected to the home gateway device 50 in order to be provided with connectivity (to the telecommunications network 100) via the home gateway device 50, all or a part of the client devices or user equipments 20, 21 may also be able to connect to a mobile communication network, i.e. independently from the home gateway device 50. In such a case, such a user equipment 20 is (or such user equipments 20, 21 are) typically equipped with (or comprise), respectively, a subscriber identity module (SIM). Such subscriber identity module(s) is (are) used for the connection of the respective user equipment 20, 21 with the mobile communication network (i.e. independent or different from the telecommunications network 100) or the mobile communication network part of the telecommunications network 100 itself. In the context of the present invention, user equipment 20 (or client device 20) is taken as an example of such user equipment having fixed and mobile capabilities, i.e. comprising a subscriber identity module; that's why user equipment 20 is also called specific user equipment 20.

A subscriber identity module or subscriber identification module (SIM), or also called a "SIM card," is typically an integrated circuit that is intended to securely store an identity of or associated or assigned to the user equipment 20, especially the international mobile subscriber identity (IMSI) number or information and/or Mobile Customer identity information and/or a unique serial number (integrated circuit card identifier (ICCID)). The subscriber identity module can also be realized as or is able to comprise a universal integrated circuit card (UICC) physical smart card and/or an embedded subscriber identity module (eSIM).

According to the present invention, it is provided for enhanced and/or more efficient fixed-mobile convergence capabilities and/or device discovery capabilities within the telecommunications network 100, to which the home gateway device 50 provides connectivity (or the possibility to connect) to (specific) client device 20 or (specific) user equipment 20 (being connected to the home gateway device 50). The (specific) client device 20 or (specific) user equipment 20—besides being able to connect to the home gateway device 50—is capable to connect to the telecommunications network 100, i.e. to its mobile part or mobile communication network (or to another telecommunications network, i.e. likewise a mobile communication network), using the subscriber identity module integrated with the specific client device or user equipment 20.

According to an exemplary embodiment of the inventive method, the specific client device or user equipment 20 is connected to or connects to the home gateway device 50 in order to connect to the telecommunications network 100, i.e. in a typical or standard manner. After such connection being established—and especially also its corresponding authentication being performed—, the home gateway device 50 uses this connection (to the specific client device or user equipment 20) to initiate an exchange of messages according to an authentication or key exchange protocol, wherein the authentication or key exchange protocol being typically either an extensible authentication protocol (EAP) or an enhanced authentication and key agreement (AKA) protocol. Thereby, identity information 200 of the specific client device or user equipment 20 is transmitted to the home gateway device 50 as part of at least one message of the authentication or key exchange protocol used, and subsequently, the authentication or key exchange protocol is terminated prematurely.

Hence, according to the present invention, the authentication or key exchange protocol is used (or initiated) despite a connection between the home gateway device 50 (acting as authenticator) and the (specific) user equipment 20 (acting as peer) already being established and the user equipment 20 already being authenticated; the authentication or key exchange protocol is primarily used to invoke the transmission of the identity information 200, by the user equipment 20, to the home gateway device 50.

Figure 2:
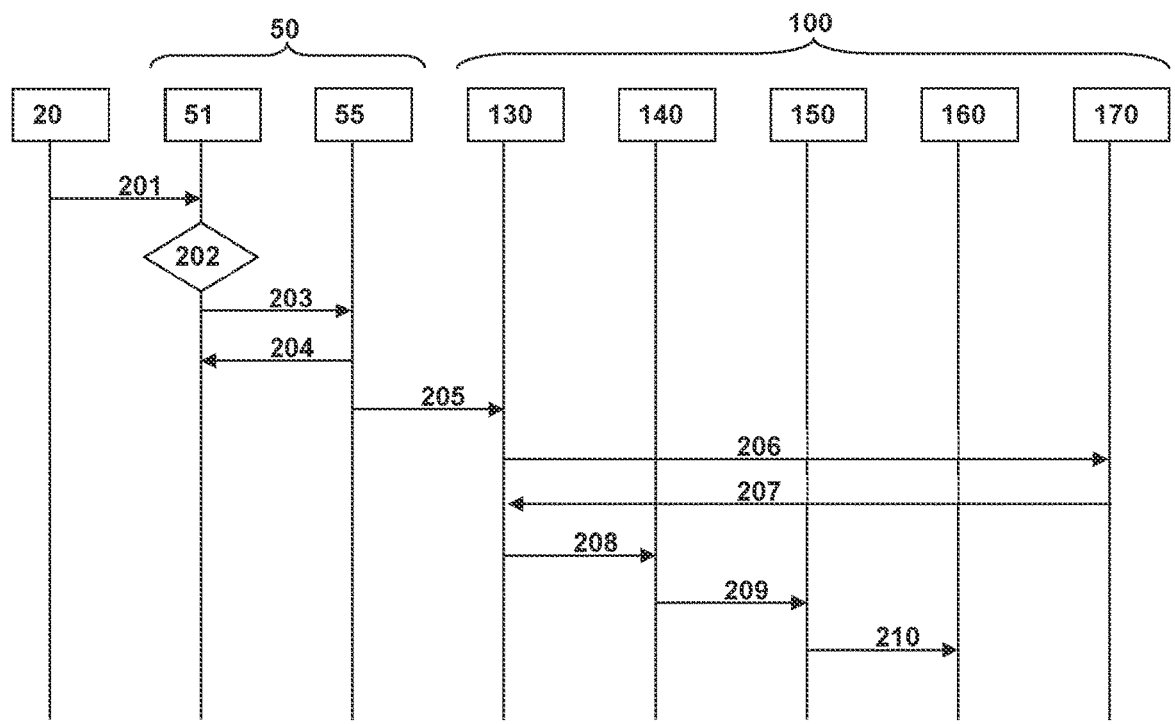
FIG. 2 schematically illustrates a communication diagram between the user equipment, the home gateway device, and the telecommunications network, especially its access control server node or instance, customer database, provisioning system, authentication, authorization, and accounting (AAA) server, and a mobile number portability platform.

In FIG. 2, an exemplary communication diagram between the (specific) user equipment 20, the home gateway device 50, and the telecommunications network 100 is schematically illustrated. The exemplary communication diagram comprises the steps of an exemplary embodiment of the inventive method together with additional exemplary processing steps. The telecommunications network 100 especially comprises an access control server node or instance 130, a customer database 140, a provisioning system 150, an AAA server 160, and a mobile number portability platform 170. The home gateway device 50 comprises an access point 51 and a database 55 (or home gateway device database 55) as its main components relevant for the present invention. In a first processing step 201, provisioning procedure (or information refresh procedure) is performed, thereby transmitting the identity information 200 of the (specific) user equipment 20 to the home gateway device 50 (via a communication between the user equipment 20 and the access point 51 of the home gateway device 50, i.e. the customer (or user equipment 20) connects to the access point 51 (or Wi-Fi), using Username and Password for the first time or after a defined periodic time, e.g., every week); hence, this first processing step 201 encompasses the first step according to an exemplary embodiment of the inventive method, i.e. the connection between the specific user equipment 20 to the home gateway device 50 is established and the specific user equipment 20 authenticated. In a second processing step 202, the home gateway device 50 (or Home Router, especially the Wi-Fi Access point 51) determines or checks whether the specific user equipment 20 is not registered yet in the database 55 (i.e. the router database of the home gateway device 50). The device information of the user equipment 20, especially its MAC address or another identifier gets stored in the database 55 or router database. In case that the device (i.e. the user equipment 20) is new (or not (any more) known) to the home gateway device 50 (or its database 55), an authentication or key exchange protocol is initiated (i.e. an exchange of messages according to such authentication or key exchange protocol) by the home gateway device 50 (towards the user equipment 20). Especially, an EAP SIM challenge is triggered to the newly connected device (i.e. the user equipment 20) to check if it holds a SIM (Dual Access device) or not. Hence, in case that the user equipment 20 comprises a subscriber identity module, the corresponding identity information 200 (i.e. typically the IMSI) of the specific client device 20 or specific user equipment 20 is transmitted to the home gateway device 50 as part of the authentication or key exchange protocol used. Hence, the second processing step 202 encompasses the second and third steps according to an exemplary embodiment of the inventive method (i.e. the home gateway device 50 uses the established connection to initiate an exchange of messages according to the authentication or key exchange protocol, thereby transmitting the identity information 200 of the specific client device 20 or specific user equipment 20 (to the home gateway device 50 or its access point 51), and the authentication or key exchange protocol is terminated prematurely). Furthermore, in a third processing step 203 and a fourth processing step 204, the access point 51 (of the home gateway device 50) and the home gateway device database 55 communicate, thereby especially updating the database 55 with the gathered information (i.e. especially the identity information 200 of the user equipment 20).

According to the exemplarily represented communication diagram according to FIG. 2, the home gateway device 50 sends, in a fifth processing step 205, the gathered information (especially the identity information 200 of the user equipment 20—as a newly discovered device having a subscriber identity module—, i.e. especially its IMSI, or SIM info), to the access control server node or instance 130 of the telecommunications network 100. Once information is received by the access control server node or instance 130 of the telecommunications network 100, it checks if there was a change or not. If there was a change, then the new SIM information shall be verified—in a sixth processing step 206 and a seventh processing step 207—by the MNP (Mobile Number Portability platform) 170 to check whether the considered identity information 200 (i.e. typically SIM card or corresponding IMSI) is one that belongs to or is registered or administered by the telecommunications network 100 (i.e. the mobile part or branch thereof) or not. Then, all this information is sent upwards to the customer database 140 (in an eighth processing step 208) to be stored. And any actions desired could be taken afterwards. In the customer database 140 and also in the access control server node or instance 130 there should be the association between home gateway devices (or home devices) with the corresponding subscriber identity modules (or its IMSIs or SIM identities) and whether they belong to the telecommunications network 100 (or its mobile part), and certain if not all information regarding the corresponding contracts. Under the assumption that the discovered SIM card (or corresponding IMSI, or the corresponding identity information 200) of the specific user equipment 20 indeed holds a SIM card of the (mobile part of) the telecommunications network 100, and, in the customer database 140 this person or group or family is eligible for an additional communication service, e.g. public hotspot access, then the customer database triggers the provisioning system 150 (in a ninth processing step 209) to provision all corresponding devices (i.e. using their known SIMs or IMSIs now) in the AAA server 160 or corresponding database that is responsible for EAP SIM authentication. The provisioning system 150 executes (in a tenth processing step 210) the provisioning procedure to the AAA server 160 for the additional communication service, e.g. public Wi-Fi access.

According to the present invention, the home gateway device 50 initiates the authentication or key exchange protocol (e.g. the EAP-SIM procedure) over the master SSID of the home gateway device 50 in order to proceed with a discovery phase (i.e. the home gateway device 50 triggering device discovery) for the mobile and fixed identity linkage: if the connected device (i.e. the respective client device) responds with rejection of the request, this device is flagged as Wi-Fi-only device in the database 55 of the home gateway device 50; otherwise if the connected client device 20 has a SIM and starts responding (to the authentication or key exchange protocol initiated by the home gateway device 50) with the IMSI, the home gateway device 50 aborts the procedure (prematurely) and reconnects the client device or user equipment 20 based on username and password to the master SSID, and registers or stores its IMSI (i.e. the identity information) in the database 55 of the home gateway device 50. Once the home gateway device has a table of all devices connected to it on the master SSID, it can classify them and correlate them with their known MAC addresses and any other 802.x standard information.

In a second profile update phase of the mobile and fixed identity linkage according to the present invention, the home gateway device 50 cascades a list of (client) devices assigned with the Line ID towards the access control server node or instance 130 (or any other secure element within the telecommunications network 100 that makes architectural sense). The access control server node or instance 130 decides on the frequency of re-discovery and data updates from the home gateway device 50. This results in the fixed-line telecommunications network 100 (or fixed-line part thereof) being provided or comprising more information regarding or about the SIM-based (client) devices (or user equipments) at home. Additionally, it is preferred according to the present invention that the access control server node or instance 130 (or any other secure element within the telecommunications network 100 that makes architectural sense) also comprises have a graph database that could be populated over time creating relationships, e.g. generated by using artificial intelligence or machine learning, to enhance the configuration and timers to trigger the discovery/rediscovery and updates, performed by the different home gateway devices within the telecommunications network 100. The procedure according to the present invention is also able to be repeated every defined period of time, especially to verify data consistency and capture of changes.

Furthermore, it is advantageously possible and preferred according to the present invention that data enrichment is performed, i.e. the access control server node or instance 130 complements customers data: The access control server node or instance 130 checks whether the different pieces of identity information 200 (i.e. typically IMSIs) collected belong to the own telecommunications network 100 or not from the Mobile Number Portability platform 170 or database. Then for those client devices or user equipment 20 related to or belonging to the telecommunications network 100, the MSISDN (mobile station integrated services digital network number), tariff information and any other relevant information is queried. Pieces of information relating to SIM-based client devices that are not related to the telecommunications network 100 could be used for upselling potential and converged offers. Additionally, in a service based architecture, the access control server node or instance 130 is able to access the equipment identity register (EIR) database or the NT analytics data lake to retrieve the last IMEI (international mobile equipment identity) information for the identified client devices or user equipments 20 related to the telecommunications network 100.

According to the present invention, it is advantageously possible to update the central database, i.e. a master customer database update: In every telecommunications network, there is usually a central customer database that contains contractual and main policy information. According to the present invention, the access control server node or instance 130 is able to cascade information collected to an upper database where it gets stored for further use in different service creations and provisioning. This provides the possibility to centralize the fixed-mobile convergence collection of information in order to open up possibilities of using the information, e.g. towards automatic provisioning or sales analysis for upsell possibilities. One of the prominent use cases is to provision all household family members that have a fixed line to be eligible for public hotspots provided by the same telecommunications network 100 (or operator). This is able to be automatically triggered by the central database to provision all customers associated with one fixed line identity using their gathered SIM devices into the AAA server to make all the family devices provisioned for public hotspots of or associated with the telecommunications network 100. Hence, centralizing the fixed-mobile convergence collection of information is intended to open up possibilities of using the information, e.g. towards automatic provisioning or sales analysis for upsell.

Furthermore according to the present invention, converged data are able to be used to provision services, e.g., via a single policy across all accesses. For example, in case that parents would like to provision quiet-time for their children, this policy is able to be applied on the home gateway device 50; the home gateway device 50 acts as an enforcement point at home but the corresponding policy is furthermore able to be transferred to the access control server node or instance 130, and the access control server node or instance 130 communicates the policy to the customer database 140, where it should already know whether the target devices of the policy are also devices within the telecommunications network 100, and if so, a copy of the policy is sent to the provisioning system to be provisioned on the mobile network.

The provisioning of the policy on the home gateway device 50 is able to be done in different ways (web page, app, customer service, . . . etc.). This step is independent from the overall procedure. To be able to enforce policies with multi-domain effect automatically, the based services meant by these policies should be available. This means that the service exists in both domains and is able to be correlated and provisioned via the association of fixed and mobile identifiers according to the present invention. To complement the access and authentication mechanisms and deepen convergence, the authentication strategy should be focused on EAP SIM support as follows: 2nd SSID strategy with EAP SIM support; Hotspot2.0 using EAP-SIM as the authentication mechanism with partners.

Hence, according to the present invention, convergence starts from the home gateway device 50, and 5G core service based architecture opens up access to critical functions that have been comparatively closed in conventional telecommunications networks. The access control server node or instance 130 is comparatively important in the architecture to bridge the fixed-mobile convergence enablers and service convergence gap. Hence, the linkage of mobile and fixed identities results in better user experience (e.g. by having a complete view on the customers & family services), a unified policy (e.g. via the ability to propagate policies from fixed to mobile seamlessly), and regarding authentication, the ability to identify the customer under different access domains and locations.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing fixed-mobile convergence capabilities and/or device discovery capabilities within a telecommunications network, wherein a home gateway device connected to the telecommunications network provides connectivity or the possibility to connect to the telecommunications network for one or more client devices or user equipments connected to the home gateway device,
   wherein a specific client device or user equipment is configured to connect to the home gateway device and to the telecommunications network or another telecommunications network using a subscriber identity module integrated with the specific client device or user equipment,
   wherein the method comprises:
   in a first step, the specific client device or user equipment is connected to or connects to the home gateway device in order to connect to the telecommunications network;
   in a second step, subsequent to the first step, the home gateway device uses the connection to the specific client device or user equipment to initiate an exchange of messages according to an authentication or key exchange protocol, wherein the authentication or key exchange protocol is an extensible authentication protocol (EAP) or an enhanced authentication and key agreement (AKA), wherein identity information of the specific client device or user equipment is transmitted to the home gateway device as part of at least one message of the authentication or key exchange protocol; and in a third step, subsequent to the second step, the authentication or key exchange protocol is prematurely terminated.

2. The method according to claim 1, wherein, during the first step, an authentication is performed and succeeds to authenticate the specific client device or user equipment to connect to the home gateway device and/or to the telecommunications network; and wherein the connection between the specific client device or user equipment and the home gateway device is established using one or a plurality of credentials to gain access to or to connect to the home gateway device, wherein the credentials are for establishing a Wi-Fi connection.

3. The method according to claim 1, wherein the authentication or key exchange protocol corresponds to an EAP-SIM protocol or an EAP-AKA protocol, and wherein, during the third step, the authentication or key exchange protocol is unfinished or incomplete upon its termination.

4. The method according to claim 1, wherein only EAP-Request/Identity messages and EAP-Response/Identity messages are exchanged between the home gateway device and the specific client device or user equipment.

5. The method according to claim 1, wherein only EAP-Request/Identity messages, EAP-Response/Identity messages, EAP-Request/SIM/Start messages and EAP-Response/SIM/Start messages are exchanged between the home gateway device and the specific client device or user equipment.

6. The method according to claim 1, wherein the specific client device or user equipment comprises international mobile subscriber identity (IMSI) information or Mobile Customer identity information, wherein the identity information transmitted to the home gateway device as part of at least one message of the authentication or key exchange protocol corresponds to the international mobile subscriber identity information or the Mobile Customer identity information of the specific client device or user equipment.

7. The method according to claim 1, wherein, via the specific client device or user equipment being repeatedly and/or regularly connected to the home gateway device, the home gateway device and the specific client device or user equipment are related or associated to one another; and wherein the home gateway device comprises an access point and a database, wherein the identity information of the specific client device or user equipment, transmitted to the home gateway device during the second step, is stored in the database of the home gateway device.

8. The method according to claim 1, wherein the identity information of the specific client device or user equipment is transmitted to an access control server node or instance of the telecommunications network as being related or associated to the home gateway device;

wherein the identity information of the specific client device or user equipment is transmitted to a mobile number portability platform of the telecommunications network in order to obtain information from the mobile number portability platform regarding whether the specific client device or user equipment is associated with the telecommunications network or with another telecommunications network, in case that the access control server node or instance did not previously have knowledge of the identity information of the specific client device or user equipment being related or associated to the home gateway device.

9. The method according to claim 8, wherein information of the specific client device or user equipment being related or associated to the home gateway device with the information obtained from the mobile number portability platform regarding the specific client device or user equipment is transmitted to and stored at a customer database of the telecommunications network.

10. The method according to claim 9, wherein user or subscriber consent is obtained prior to:

the identity information of the specific client device or user equipment being transmitted to the home gateway device as part of the authentication or key exchange protocol used; and/or the identity information of the specific client device or user equipment being stored in the database of the home gateway device; and/or the identity information of the specific client device or user equipment being transmitted to the telecommunications network.

11. A system for providing fixed-mobile convergence capabilities and/or device discovery capabilities within a telecommunications network, wherein the system comprises:

a home gateway device connected to the telecommunications network and configured to provide connectivity or the possibility to connect to the telecommunications network for one or more client devices or user equipments connected to the home gateway device; and a specific client device or user equipment configured to connect to the home gateway device and to the telecommunications network or another telecommunications network using a subscriber identity module integrated with the specific client device or user equipment;

wherein the specific client device or user equipment is connected to or is configured to connect to the home gateway device in order to connect to the telecommunications network;

wherein the home gateway device is configured to use the connection to the specific client device or user equipment to initiate an exchange of messages according to an authentication or key exchange protocol, wherein the authentication or key exchange protocol is an extensible authentication protocol (EAP) or an enhanced authentication and key agreement (AKA), and wherein identity information of the specific client device or user equipment is transmitted to the home gateway device as part of at least one message of the authentication or key exchange protocol; and wherein the system is configured to prematurely terminate the authentication or key exchange protocol.

12. One or more non-transitory computer-readable mediums having processor-executable instructions stored thereon for providing fixed-mobile convergence capabilities and/or device discovery capabilities within a telecommunications network, wherein a home gateway device connected to the telecommunications network provides connectivity or the possibility to connect to the telecommunications network for one or more client devices or user equipments connected to the home gateway device, wherein a specific client device or user equipment is configured to connect to the home gateway device and to the telecommunications network or another telecommunications network using a subscriber identity module integrated with the specific client device or user equipment, wherein the processor-executable instructions, when executed, facilitate:

in a first step, the specific client device or user equipment is connected to or connects to the home gateway device in order to connect to the telecommunications network;

in a second step, subsequent to the first step, the home gateway device uses the connection to the specific client device or user equipment to initiate an exchange of messages according to an authentication or key exchange protocol, wherein the authentication or key exchange protocol is an extensible authentication protocol (EAP) or an enhanced authentication and key agreement (AKA), wherein identity information of the specific client device or user equipment is transmitted to the home gateway device as part of at least one message of the authentication or key exchange protocol; and in a third step, subsequent to the second step, the authentication or key exchange protocol is prematurely terminated.

\* \* \* \* \*